(No Model.)
J. T. WAINWRIGHT.
ART OF MAKING GLASS AND VITREOUS OR PORCELANEOUS PRODUCTS.
No. 351,413. Patented Oct. 26, 1886.
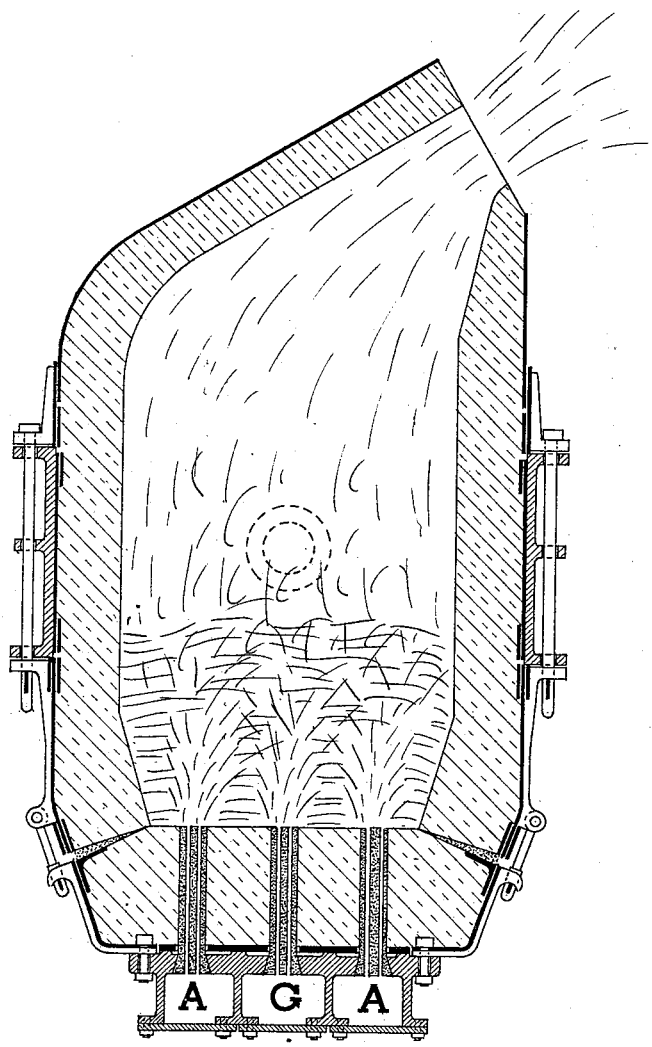
WITNESSES:
Hall W. Watts
T. L. Owen
Jacob T. Wainwright INVENTOR
ATTORNEY

UNITED STATES PATENT OFFICE.

JACOB T. WAINWRIGHT, OF ALLEGHENY, PENNSYLVANIA.

ART OF MAKING GLASS AND VITREOUS OR PORCELANEOUS PRODUCTS.

SPECIFICATION forming part of Letters Patent No. 351,413, dated October 26, 1886.

Application filed August 20, 1886. Serial No. 211,441. (No model.)

*To all whom it may concern:*

Be it known that I, JACOB T. WAINWRIGHT, a citizen of the United States, residing at Allegheny, in the county of Allegheny and State of Pennsylvania, have invented certain new and useful Improvements in the Art of Making Glass and Vitreous or Porcelaneous Products; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

Various means have been employed in arts requiring high temperatures to heat either air or fluid fuel (one or both) prior to combustion. The best known apparatus for these purposes are hot-blast stoves and regenerative furnaces; but these are quickly destroyed by the great heat to which they are necessarily exposed, and they are also incapable of attaining the higher temperatures by reason of their great loss by radiation; and, furthermore, they fail to utilize fully the heat stored or produced in the heating-chamber by reason of its distance from the working or melting chamber. In this particular my improved method approximates the usual operation of blast-furnaces, and no heat is wasted through the walls of the flues, nor is its energy weakened by an unnecessarily extensive field of radiation.

My improvement consists in forcing air or fluid fuel—such as gas or petroleum—one or both of them, into a molten vitreous bath charged with glass-making material, in such manner that either air or gas, or both of them, must pass through the molten matter and be heated before they meet, and before combustion occurs. If only one of these is passed through the bath, the other is supplied at or near the surface thereof in such manner that the fuel is burned near said material and the bath, so that the former is melted and the latter heated by the combustion. Preferably the solid matter is charged upon the bath. It would, however, be practicable to introduce the material into the melting-vessel and pour molten glass upon it. Heretofore air and gas have been mingled in a tuyere box or chamber in communication with the receptacle for molten metal, and the gas has therefore necessarily been ignited before penetrating the bath. When separate blasts of either air or gas have been used, the other was omitted, or, if supplied, was introduced into a chamber or furnace remote from the molten bath. I have myself used separate blasts of air and gas, and forced them separately into molten matters to preheat the agents of combustion in the art of reducing ore, and such particular process is not contemplated in this branch of the invention, and is not herein claimed.

In the accompanying drawing a Bessemer converter of usual construction as to its general form is represented, except that the bottom is constructed and arranged for distinct but simultaneous blasts, both trunnions being made hollow to convey a separate blast to each of two annular blast-boxes—one for air or oxygen, (shown at A,) and one for fluid fuel, (at G.) Detachable blast-boxes with detachable covers are shown in the present instance, which may be provided with gaskets made of asbestus or other suitable material for the purpose of making tight joints. My invention is not, however, limited to the apparatus described, as various constructions can be either selected or readily devised to carry the improved mode of procedure into effect. This converter, or whatever melting-vessel is employed, may be lined with the material of which glass pots and furnaces are usually made.

It will be understood that blowing-engines or equivalents may be employed, as well as the customary apparatus for executing other steps in the art of glass-manufacture.

The waste heat of the escaping products of combustion may be utilized to heat other chambers or materials.

The substances for making glass should be selected and prepared in the usual manner, having in view the particular product desired. They may be reduced to a state of fineness, dried, mixed, and fritted by approved methods, and may be charged into the melting-chamber together with broken glass. My invention, however, does not relate to these particulars of the art, and any approved materials and methods of preparation and of charging the same not inconsistent with my improved manner of melting may be adopted.

In operation I provide a molten bath by any well-known means, and charge the materials for making glass into or upon the same, or melted glass may be poured upon the solids, and I then introduce air and gas. In using the construction illustrated these are forced through distinct tuyeres at the bottom of the converter, and they necessarily traverse a portion of the bath before they meet for combustion, which will take place near or below the surface of the bath and in proximity to the unmelted materials.

By the use of apparatus provided with suitable tuyeres either air or gas may be introduced at or near the surface of the bath and among the unmelted materials; but one of these should pass through the molten matter, or a portion of it, and be heated before combustion. By this mode of operation the heat due to the combustion of heated elements is applied immediately to the substances to be melted, and loss by radiation is largely reduced. The bath is also kept hot by this burning of gas, as it is constantly agitated, moved, and mixed by the currents produced by the blast. This mingling of the various ingredients in the bath by the blast is an important advantage of the method described.

When required, the molten glass may be cooled for further manipulations by injecting either air alone or air or gas mingled with steam.

The amount of combustion and consequent heat can be controlled by regulating the blasts by means of valves or other known means.

My improvement is consistent with a variation of either the air or gas blast, according to the character and condition of the bath or charge, and according to particular effects desired—as, for example, if it is desired to apply moderate degrees of heat, as customary in fritting, the batch having been charged without that preliminary step, the temperature can be regulated accordingly, and subsequently raised to produce complete fusion and intermixture of ingredients. The invention is also consistent with the use of mingled gases and vapors, and with an admixture therewith of powdered fuel, and it is also consistent with the use of air mingled with uninflammable gases or with combustible gases, the oxygen of the air being in excess, provided the use of the same is not inconsistent with the separate passage of either air or combustible gas through molten matter before reaching a point where combustion occurs, whereby either air or combustible gas is preheated. The fuels that I prefer are natural gas, hydrocarbon gas, or petroleum; but gaseous or vaporous fuel made from coal or other carbonaceous matter by any known process may be employed.

Having thus described my invention, what I desire to claim and secure by Letters Patent is—

1. In the art of making glass, the improvement which consists in providing a molten bath charged with glass-making material, passing air and gaseous or volatile fuel in separate but simultaneous blasts into the molten matter, whereby the air and fuel are preheated and then burned below or near the surface of the bath and near the charge, substantially as set forth.

2. In the art of making glass, the improvement which consists in providing a molten bath charged with glass-making material, passing air into this molten matter, whereby the air is preheated, and supplying gas to be burned at or near the surface of the bath and below or in the presence of the charge, substantially as set forth.

3. In the art of making glass, the improvement which consists in providing a molten bath charged with glass-making material, passing gaseous or volatile fuel into the molten matter, whereby this fuel is preheated, and supplying air to produce combustion below or in the presence of the charge, substantially as described.

In testimony whereof I affix my signature in presence of two witnesses.

JACOB T. WAINWRIGHT.

Witnesses:
H. W. WATTS,
T. L. OWEN.